Dec. 29, 1964     C. CAPRIOLI     3,163,067
ARTICLE SEPARATING APPARATUS
Filed Sept. 17, 1962     3 Sheets-Sheet 1
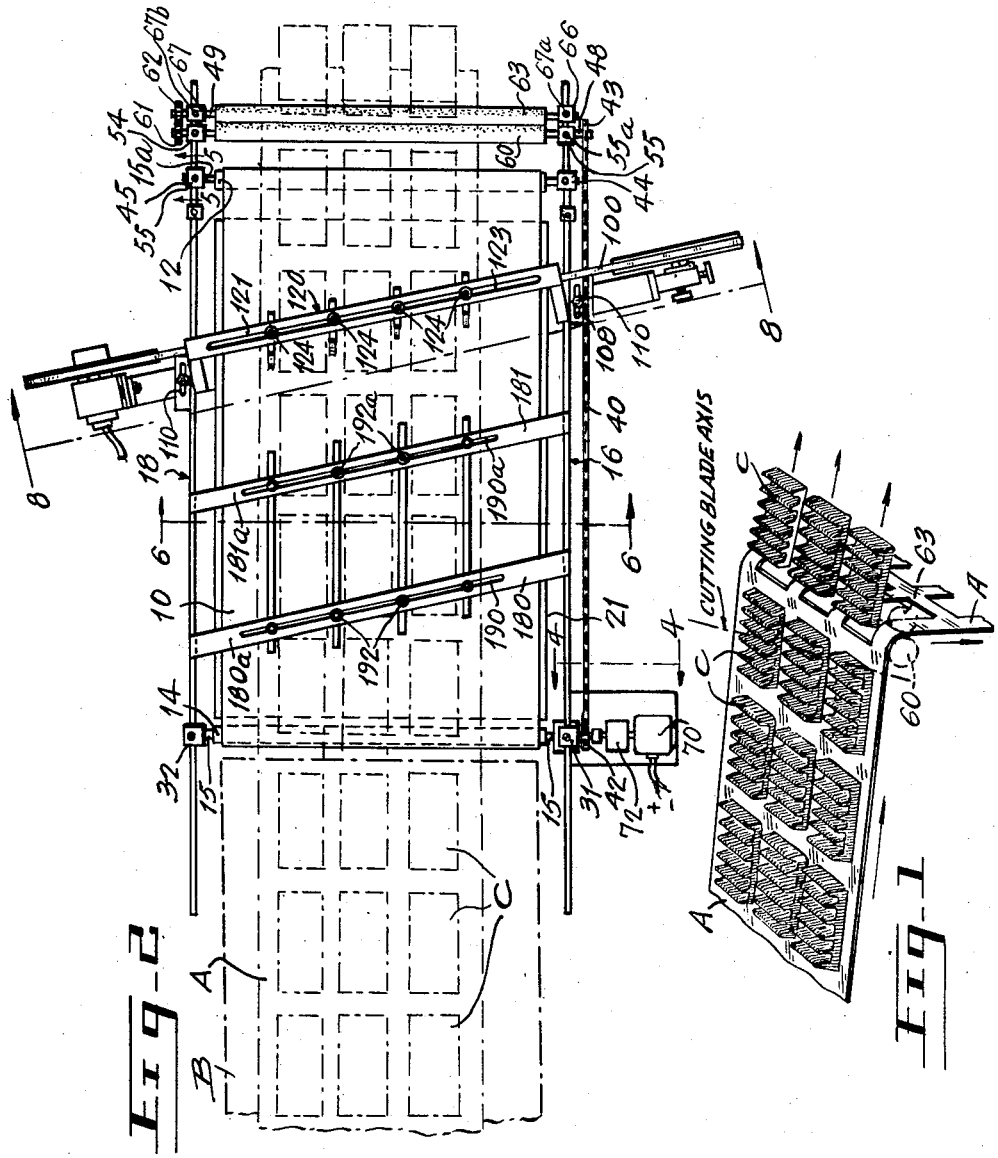
Inventor
Carlo CAPRIOLI
Attorney

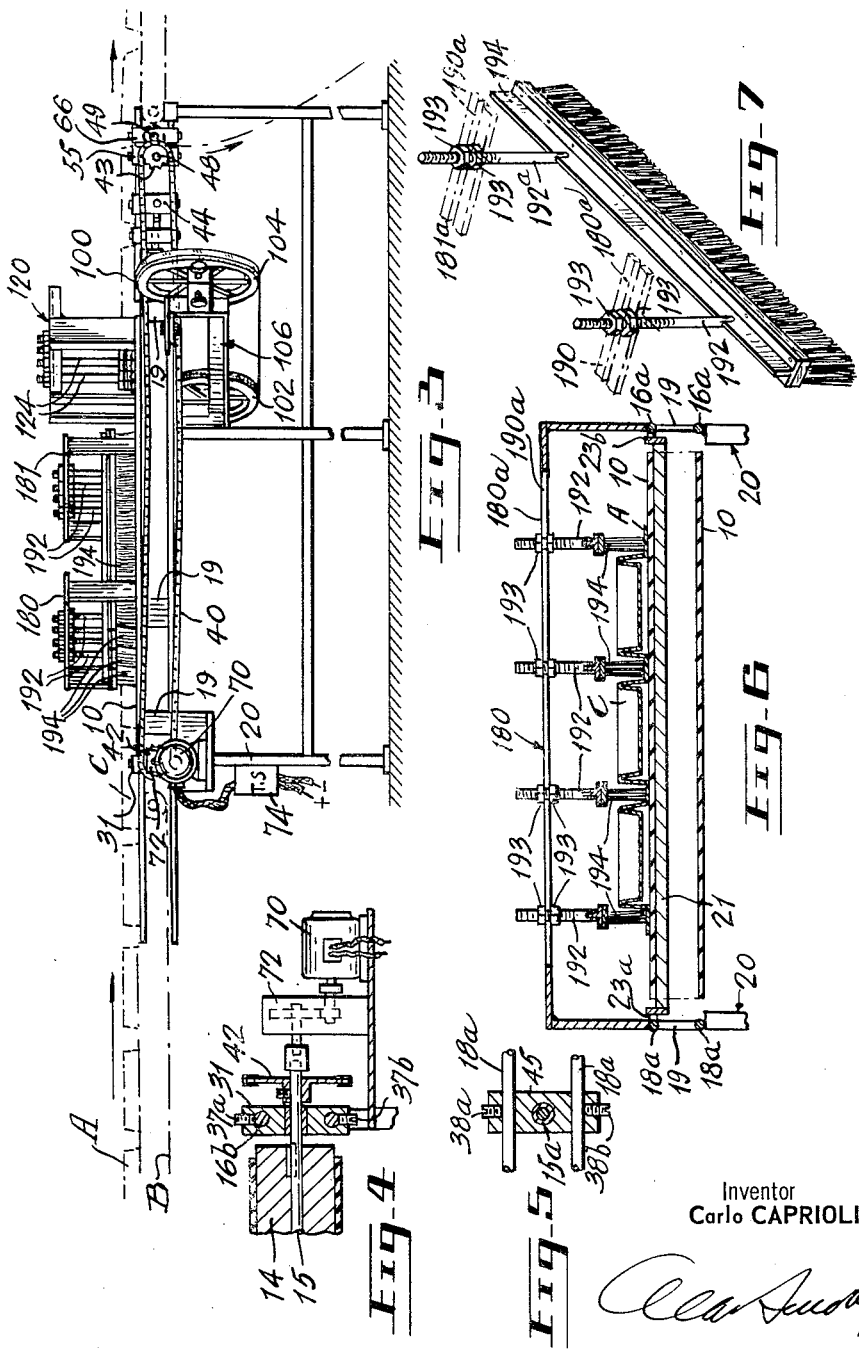

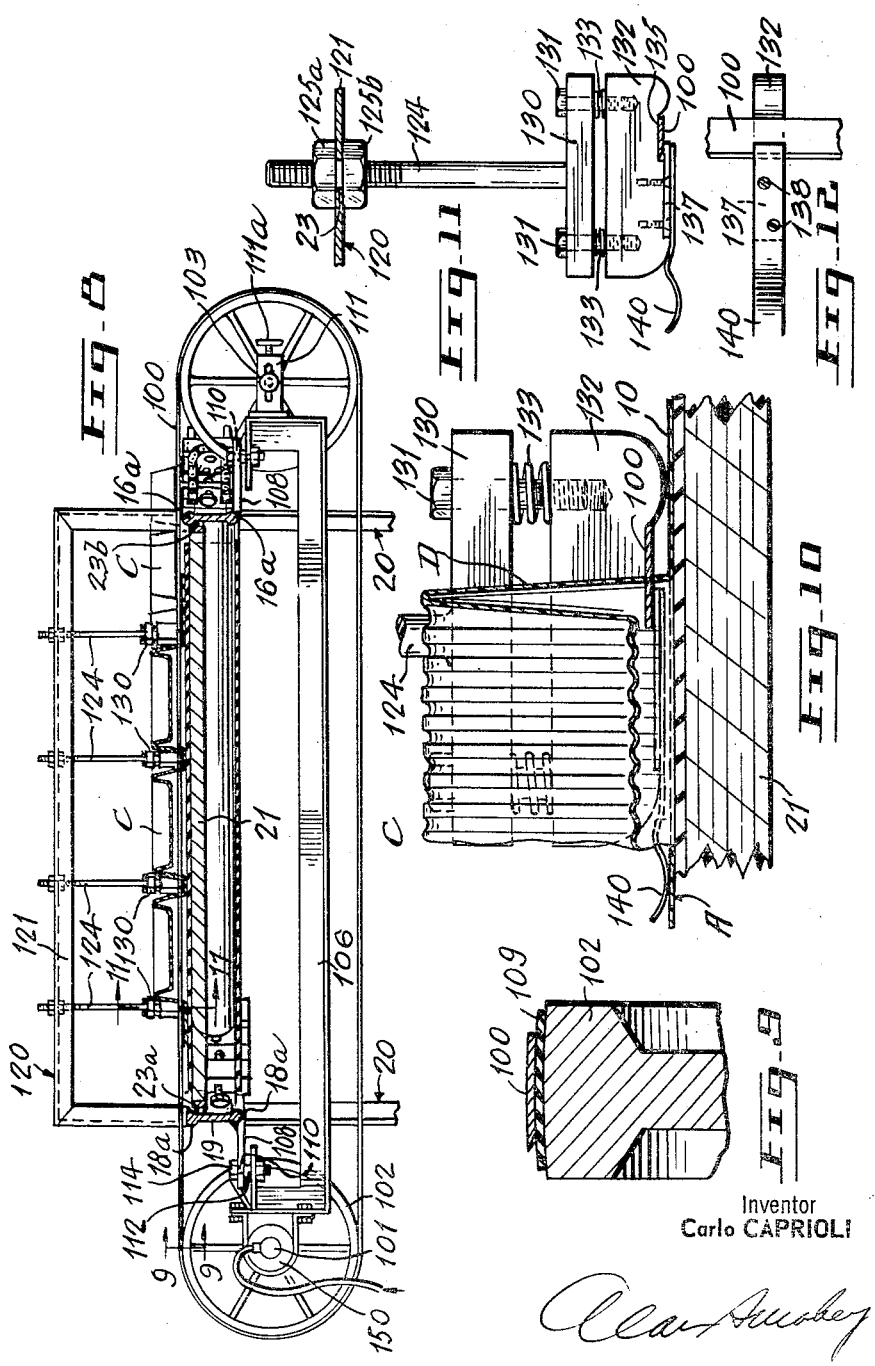

3,163,067
ARTICLE SEPARATING APPARATUS
Carlo Caprioli, Montreal, Quebec, Canada, assignor to Plastic Packaging Products Limited, Montreal, Quebec, Canada
Filed Sept. 17, 1962, Ser. No. 224,061
1 Claim. (Cl. 83—201)

The present invention relates to improvements in apparatus utilized in the manufacture of plastic articles vacuum moulded in multiple units in a continuous sheet and more specifically to an apparatus designed to separate said multiple units from the common sheet.

One method of producing light plastic articles, such as blister packages, boxes, trays or the like is to feed the material in large sheets, or in a continuous film, into and out of vacuum moulding dies so that a plurality of such articles are moulded into the sheet in spaced apart rows. The moulded sheets are then necessarily subjected to a further operation wherein the individual units are separated from the common sheet from which they were formed. This further operation may be carried out in a number of ways but the most effective, particularly when the plastic material is of a light gauge, is to pass the sheets through a further apparatus wherein a cutting blade traveling horizontally over the sheet cuts the articles free from their attachment with the sheet.

The present apparatus is an improvement in cutting machines of this type and it is designed so that the moulded articles can be severed from the sheet at any desired height from the sheet so that the base flanges of the articles can be cut exactly where required eliminating any further finishing operations.

In accordance with the invention, the apparatus consists essentially of a supporting frame on which there is mounted means for conveying the moulded sheet along the frame in a horizontal plane with the moulded articles extending upwardly from the sheet. An endless cutting blade is mounted on the frame so that the upper run extends diagonally across the path of the conveyed moulded sheet and parallel to the upper surface of the conveying means. Adjustable blade holding means are provided to retain the cutting blade securely at the desired height relative to the conveyor and means are also provided to resiliently hold the moulded sheet in horizontal position during the cutting process.

Having thus generally described the nature of the invention, particular reference will be made to the accompanying drawings, and in which:

FIGURE 1 is a somewhat diagrammatic view in perspective elevation of a continuous sheet of plastic material having moulded therein a plurality of trays as it would appear when passing through the cutting blade of the invention.

FIGURE 2 is a view in plan of the apparatus of the invention.

FIGURE 3 is a view in side elevation of the apparatus of FIGURE 1.

FIGURE 4 is a sectional view of the construction shown in FIGURE 2 along the line 4—4.

FIGURE 5 is a sectional view of FIGURE 2 along the line 5—5.

FIGURE 6 is a sectional view of FIGURE 2 along the line 6—6 to illustrate the one-way ratchet arrangement for the conveyor belt.

FIGURE 7 is an enlarged detail view in perspective elevation of one of the hold-down brushes.

FIGURE 8 is a cross sectional view of FIGURE 2 along the line 8—8.

FIGURE 9 is an enlarged detail view of a portion of FIGURE 8 along the line 9—9 to illustrate the resilient backing for the blade supporting wheels.

FIGURE 10 is a cross-sectional view of FIGURE 8 along the line 10—10 to illustrate in more detail the position and means of supporting the endless cutting blade.

FIGURE 11 is an enlarged detail view of one of the adjustable cutting blade supports.

FIGURE 12 is a bottom plan view of the construction shown in FIGURE 11.

With particular reference to FIGURES 1, 2 and 3 of the drawings, the present article severing apparatus is shown as being embodied in a continuous vacuum forming and finishing arrangement with the moulded articles being delivered as extending outwardly from a continuous web A along a conveyor B onto a conveyor belt 10 forming part of the present apparatus.

The endless conveyor belt 10 is mounted on a main supporting frame 20 for controlled intermittent travel whereby the articles C are delivered to a cutting blade 100 for separation from the web A. The conveyor belt 10 is supported between spaced belt supporting rollers 12, 14 which in turn are mounted for adjustable rotation between spaced apart longitudinal upper frame assemblies 16, 18 which extend, one at each side, along the outer marginal edges of the belt 10. A coextensive slide plate 21 is mounted so as to extend between the frame assemblies 16, 18 directly beneath the belt 10 to provide a rigid supporting surface for the cutting operation.

As shown most clearly in FIGURES 2, 3 and 4 each of the longitudinal frame assemblies 16, 18 include a pair of parallel spaced apart main members 16a, 18a of rod-like formation which are tied together by reinforcing webs 19. The assembly of plate 21, and assemblies 16, 18 are mounted on the main frame 20 by attachment to upright frame members 23a, 23b as shown generally in FIGURE 8. The belt supporting roller 14 is mounted on a shaft 15 and as shown in FIGURE 4, the shaft 15 is journalled at one end by its engagement with a bearing block 31 and at the other end by a bearing block 32. The bearing blocks 31, 32 are mounted on the frames 16, 18 by sliding engagement with the rod-like frame members 16a, 18a of the respective upper frame assemblies. Set screws 37a, 37b are provided in the blocks 31, 32 to provide a means of retaining the blocks in any desired location permitting adjustment to the roller 14 and also providing a means of maintaining the desired tension on a drive chain 40.

The belt supporting roller 12 is mounted on a shaft 15a journaled for rotation on bearing blocks 44, 45 having set screws 38a, 38b which are also slidably and adjustably mounted on the frame members 16a, 18a as described, see FIGURE 5.

The driving chain 40 extends between a gear 42 mounted on the shaft 15 and a further gear 43 mounted on a shaft 48. The shaft 48 is journaled between bearing blocks 54, 55 with set screws 55a, 55b and the blocks 54, 55 are mounted on the rod-like frame members 16a, 18a as previously described. The shaft 48 supports a first take-up roller 60 and a gear 61 mounted on the end of this shaft is in meshed engagement with a further gear 62 mounted on the end of a shaft 49. The shaft 49 is journaled in bearing blocks 66, 67 with set screws 67a, 67b which are mounted on the frame members 16a, 18a adjacent the bearing blocks 54, 55. A second take-up roller 63 is mounted on the shaft 49 so that rotation of the roller 60 in one direction through the shaft 48 causes a counter-rotation of the roller 63 through the shaft 49. The web receiving nip between the rollers 60, 63 can thus be readily adjusted through the adjustable bearing blocks 54, 55 and 66, 67. In the preferred construction, the gear ratio between the gears 61, 62 is selected so that the roller 63 is driven slightly faster than the roller 60 giving an extra draw or pull to the material web A as it proceeds from the conveyor belt 10 with the severed articles C being conveyed to a suitable dumping location.

In the present construction illustrated the web A is delivered to the conveyor 10 in an intermittent sequence depending on the time required to accomplish the vacuum moulding step. Accordingly, the drive to the conveyor belt is also intermittent and is accomplished by having an electric motor 70 coupled to the end of the shaft 15 through a suitable speed reducing transmission 72. The motor 70 is connected to and controlled by a time sequence switch arrangement 74 which, as is well known, can be set for any desired sequence of motor actuation and stopping. In the present case the time delay between actuations and the length of time of each actuation would be regulated to agree with the sequential movement of the moulded articles along the conveyor B. It will be understood that in the case where the web A was available in a continuous conveying motion the drive applied to the chain 40 would also be continuous.

The article severing arrangement of the present apparatus consists of the endless blade 100 which is supported for cutting action diagonally across the upper surface of the conveyor belt 10. The cutting blade 100 is supported on band pulleys 102, 104 which are journaled at each end of a supporting framework 106. Attachment plates 108 are welded to each side of the upper frame members 16a, 18a and these are provided with elongated slots 110 registering with borings 112 in the framework 106. With this arrangement, bolts 114 are utilized to secure the framework 106 in the desired location, the slots 110 permitting angular adjustment.

As shown in FIGURE 9, the band pulleys 102, 104 are preferably provided with at least a coating of non-metallic flexible material 109 to prevent metal to metal contact between the cutting blade 100 and the pulley peripheries.

With particular reference to FIGURE 8, a motor 150 is mounted on the framework 106 in direct driving contact with the shaft 101 supporting the pulley 102. The shaft 103 supporting the pulley 104 is journaled in an adjustable bearing 111 having an adjustment screw 111a so as to provide a means of tension adjustment of the run of the cutting blade 100.

In order that the upper cutting run of the blade 100 be effectively controlled and guided relative to the articles C and the base web A a supporting frame 120 is mounted on the frame members 16a, 18a so as to diagonally span the conveyor belt 10 from side to side. The upper transverse frame member 121 of the frame 120 is slotted, along its length, as indicated at 123 and a plurality of threaded shafts 124 are adjustably retained in this slot by locking nuts 125a, 125b, see FIGURES 2, 8 and 11. Each of the shafts 124 is provided with a base 130 and a blade guiding member 132 is resiliently mounted on each base 130 by bolts 131 and springs 133 therebetween. Each blade guiding member 132 is contoured as shown in FIGURE 11 so as to have a blade receiving recess 135 and a replaceable plate 137 secured to the member 132 by screws 138 is utilized to keep the blade 100 from pulling downwards out of the guiding recess. A resilient web holding member 140 is secured to the member 132 by the screws 138 so that a resilient downward pressure is maintained on the web A as it is pulled past the cutting blade 100 by the action of the conveyor 10 and take-up rollers 60, 63.

As a further aid in keeping the web A in flat contact with the conveyor belt 10 an additional pair of supporting frames 180, 181 are mounted on the frame members 16a, 18a so as to diagonally span the belt 10. The top members 180a, 181a of each of the frames 180, 181 are provided with elongated slots 190, 190a and these are adapted to receive threaded shafts 192, 192a which are adjustably retained by spaced apart nuts 193. As shown in FIGURE 7, each pair of shafts 192, 192a are connected to and support an elongated brush assembly 194. With this arrangement the brush assembly 194 is aligned so as to resiliently contact the web surface A between the articles C as the web is conveyed into contact with the cutting blade 100, see FIGRE 6.

As will be apparent, the brush assembly 194 and blade guiding members 132 can be readily aligned and adjusted heightwise to suit any continuous formation of moulded articles. In the example illustrated, the articles C have dependent flanges D meeting the web A and as shown in FIGURE 10 the web A is held down and the blade 100, by adjustment of the guide members 132, presented to the flanges D slightly above the juncture with the web A so as to slice them clearly from the web A which is carried off, as shown in FIGURE 1 by the take-up rolls 60, 63.

A main feature of the present invention resides in the fact that the web A is conveyed, either continuously or at intermittent intervals, along a straight line path so as to pass beneath a diagonally placed endless cutting blade whereby moulded articles extending upwardly from the web are separated from said web along a line parallel thereto and at any desired height from the upper surface of the web.

I claim:

A cutting apparatus adapted to separate in sequence a plurality of articles moulded in spaced apart relationship from a common material sheet; said apparatus comprising, a supporting frame, a sheet conveying means including an endless conveyoor belt mounted on said frame and adapted to convey said material sheet along a straight line path with said moulded articles extending outwardly therefrom, an endless cutting blade mounted on said supporting frame with an effective run above and transversely of the path of said conveyor belt and a return run beneath said conveyor belt, an elongated supporting frame mounted on said main supporting frame so as to span said conveyor belt upper surface, a plurality of shafts mounted for vertical adjustment and in spaced relationship along the length of said elongated frame and a blade guiding member mounted on each of said shafts including a blade receiving recess adapted to slidably receive said cutting blade for guiding alignment relative to said conveyor belt upper surface, each of said blade guiding members including an upper portion fixedly mounted on said adjustable shaft and a lower portion resiliently connected to said upper portion, said guiding member lower portion containing said blade receiving recess, and a pressure member mounted on each of said members lower portions beneath said blade receiving recess and being adapted to resiliently bear against said material sheet as it passes beneath said cutting blade, whereby the spacing between the effective run of said cutting blade and the upper surface of said conveyor belt can be varied to separate said moulded articles from said sheet along a horizontal plane at any desired height from said material sheet.

References Cited in the file of this patent
UNITED STATES PATENTS

| | | |
|---|---|---|
| 317,469 | Moses et al. | May 5, 1885 |
| 617,151 | Feister | Jan. 3, 1899 |
| 1,118,610 | Winchester | Nov. 24, 1914 |
| 1,786,542 | MacDonald | Dec. 30, 1930 |
| 2,593,843 | Cannon | Apr. 22, 1952 |
| 3,025,741 | Wagner | Mar. 20, 1962 |